No. 612,757. Patented Oct. 18, 1898.
F. B. PARKS.
COMPOSITION FOR MENDING TIRES.
(Application filed Aug. 21, 1897.)
(No Model.)
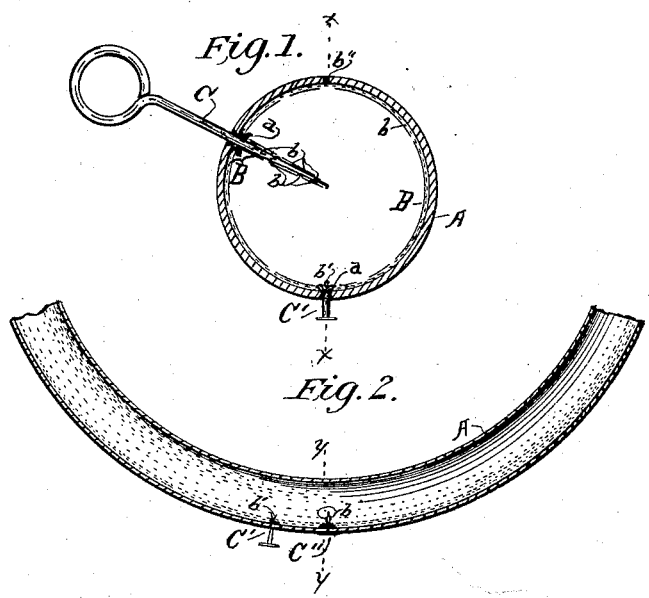
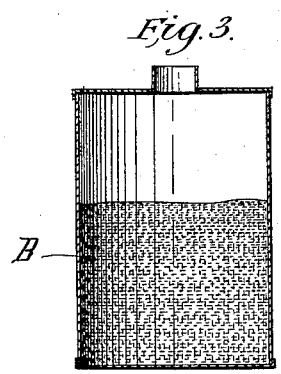
Witnesses.
Georgia E. Cilley
Freeman Lathrop
Inventor.
Fred B. Parks
By. Cilley & Allgier
Attorneys.
THE NORRIS PETERS CO., PHOTO-LITHO., WASHINGTON, D. C.

UNITED STATES PATENT OFFICE.

FRED B. PARKS, OF GRAND RAPIDS, MICHIGAN, ASSIGNOR TO THE F. B. PARKS TIRE HEALING COMPANY, OF SAME PLACE.

COMPOSITION FOR MENDING TIRES.

SPECIFICATION forming part of Letters Patent No. 612,757, dated October 18, 1898.

Application filed August 21, 1897. Serial No. 649,050. (No specimens.)

*To all whom it may concern:*

Be it known that I, FRED B. PARKS, a citizen of the United States, residing at Grand Rapids, in the county of Kent and State of Michigan, have invented a new and useful composition of matter for automatically mending punctures in pneumatic tires as used upon bicycles and kindred wheels, of which the following is a description.

In the accompanying drawings, Figure 1 represents a transverse section of a tire on the line $y\,y$ of Fig. 2. Fig. 2 is a sectional elevation of a tire on the line $x\,x$ of Fig. 1, both of said figures showing the composition spread over the inner surface of the tire; and Fig. 3 is a vertical section of a can with a quantity of my composition, showing the seeds in actual suspension.

Similar letters refer to similar parts throughout the several views.

My composition consists of fine vegetable seeds $b$, suspended in a thick non-drying liquid vehicle B, composed, preferably, of glucose with a small amount of chemically-pure glycerin.

Of vegetable seeds I find Kentucky bluegrass seed or red-top seed the best. Both of these seeds are very small diametrically and somewhat elongated, so that they have a tendency to enter the puncture endwise and wedge themselves therein.

In my tests I make use of an eight-penny-nail wire, as represented at C in Fig. 1, and I find upon cutting the tire that the seeds and glucose adhere to the sides of the wire, as shown upon the inner end or point of the wire C, hereinbefore referred to. When the wire or any other article passes through the tire, it carries the ragged edges of the rubber at the puncture through, so that the edges of the puncture are thrown beyond the inner surface of the tire, as indicated at $a$, so that the seed on the wire, when withdrawing the wire, is drawn to contact with these edges, and when the wire, tack, or whatever may have punctured the tire is removed the edges of the rubber in springing to place will so grasp or clamp the seed (see $b'$ and $b''$) that it will effectually dam the puncture, as at $b''$.

$b'$ in Figs. 1 and 2 represents the seed as between the edges of the rubber in substantially the position they assume at the instant of withdrawing the puncturing obstacle, and $b''$ represents it in the position assumed when the obstacle is wholly withdrawn and the rubber assumes its normal position.

I find in using large round seeds that they will not enter the puncture, but simply rest against the inner end of it and cannot be relied upon to effectually close it, and that small round seeds are likely to be forced through large punctures by the pressure of the air within the tire, and a scaly substance, as bran, will simply rest flatwise over the puncture, and while it is somewhat efficacious with very small punctures it is entirely unreliable with large ones.

The vehicle must have sufficient body to hold the seeds in perfect suspension and to adhere and hold the seeds in a floating condition upon the surface of the tire, and there should be a sufficient quantity of seeds to insure some of them taking effect in every puncture no matter how numerous.

I find that minute elongated seeds or of biconical form, tapering from the center toward each end, will, when suspended in a proper vehicle, effectually close punctures from the size of a carpet-tack to the size of a ten-penny wire nail, which I fail to close otherwise.

Having thus fully described my composition and in what manner it is applied, what I claim, and desire to secure by Letters Patent of the United States, is—

1. The herein-described composition of matter consisting of minute vegetable seeds of biconical form, and a non-drying, semifluid vehicle consisting of glucose and glycerin of proper consistency to hold the seeds in proper suspension, substantially as, and for the purpose set forth.

2. The herein-described composition of matter for mending punctures in pneumatic tires, consisting of minute vegetable seeds suspended in glucose and glycerin injected into the tire, substantially as specified.

3. The herein-described composition of matter consisting of fine vegetable seeds suspended in glucose and glycerin, substantially as and for the purpose set forth.

Signed at Grand Rapids, Michigan, August 18, 1897.

FRED B. PARKS.

In presence of—
  I. J. CILLEY,
  A. ALLGIER.